July 14, 1925.

A. J. PERKINS

HYDRAULIC SHOCK ABSORBER

Filed Oct. 13, 1923

1,545,922

INVENTOR
Alfred J. Perkins
BY
J. Wm. Ellis
ATTORNEY

Patented July 14, 1925.

1,545,922

UNITED STATES PATENT OFFICE.

ALFRED J. PERKINS, OF HAMBURG, NEW YORK.

HYDRAULIC SHOCK ABSORBER.

Application filed October 13, 1923. Serial No. 668,255.

*To all whom it may concern:*

Be it known that I, ALFRED J. PERKINS, a citizen of the United States of America, and a resident of the village of Hamburg, county of Erie, and State of New York, have invented certain new and useful Improvements in Hydraulic Shock Absorbers, of which the following is a full, clear, and exact description.

The principal objects of my invention are to provide a shock absorber of the hydraulic type, which shall be compact in design; one simple and cheap to manufacture; and one which has comparatively few moving parts.

Another object has been to provide a device of this nature which shall permit unrestrained movement of the parts in one direction, and a variable resistance against movement of the parts in the opposite direction, whereby the shock of the moving parts will be gradually applied, thus preventing sudden application of the resistance.

The above objects and advantages have been accomplished by the device shown in the accompanying drawings, of which:

Figure 1:
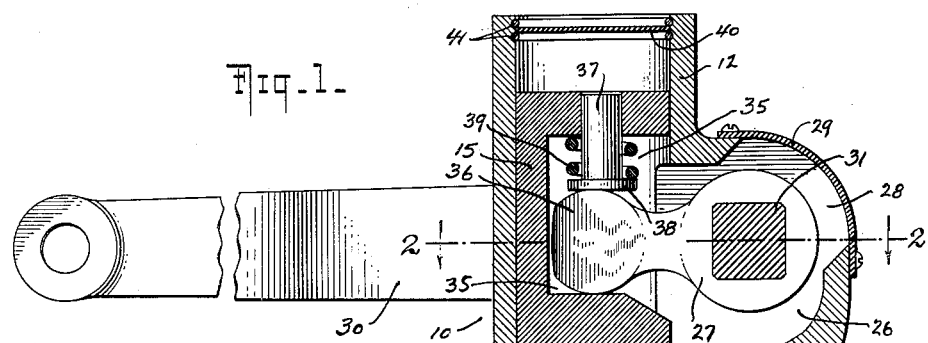
Fig. 1 is a longitudinal, sectional elevation of my device.
Figure 3:
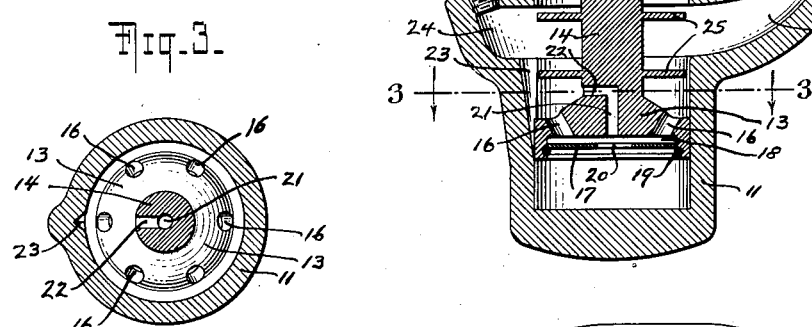
Fig. 3 is a similar view, taken on line 3—3 of Fig. 1.
Figure 2:
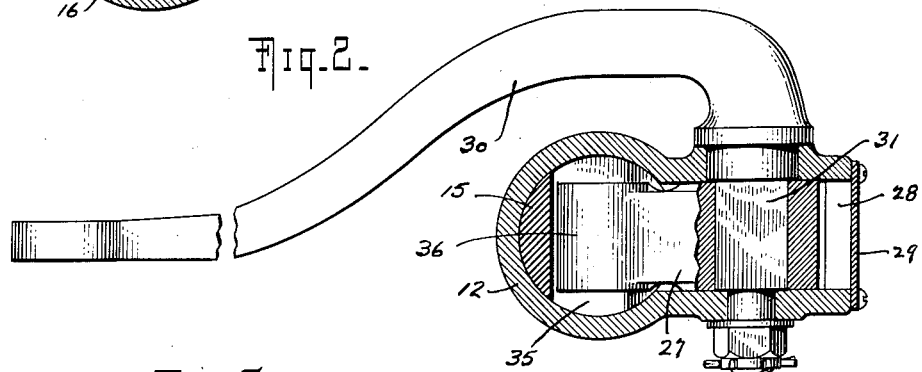
Fig. 2 is a sectional, plan view of the same, taken on line 2—2 of Fig. 1.

Referring to the form of device shown in Figs. 1 to 3, inclusive, 10 represents the body of a shock absorber, which is provided at its lower end with a cylinder 11, and at its upper end with a guide cylinder 12. A piston 13 is mounted in the cylinder 11 and is carried by a piston rod 14. The piston rod is preferably integral with the piston, and has at its upper end a piston rod head 15, which is slidably mounted in the guide cylinder 12, forming part of the body 10. The piston 13 is provided with a plurality of ports 16, below which is arranged a valve disc 17. The valve disc is held within a recess 18 in the piston by means of a wire 19, which is sprung into an annular groove formed for it in the inner wall of the piston. The valve disc 17 controls the ports 16 through the piston, and it is provided with a central opening 20. The piston 13 is provided through its center with a longitudinal passageway 21 which terminates in a lateral passageway 22. The passageway 22 is formed preferably in the lower end of the piston rod 14. The passageways 21 and 22 are of such a size that they provide a passageway or by-pass for the restricted flow of the fluid from the lower side of the piston to the upper side thereof, when the piston is moved downwardly, and when the ports 16 are closed by the valve disc 17. Formed in the wall of the cylinder 11 is an auxiliary by-pass 23. This by-pass is preferably V-shaped in cross-section and graduated in area starting from a point a little below the center of travel of the piston, where it merges into the wall of the cylinder to a point near the top thereof, whereby there will be a gradually diminishing auxiliary flow of fluid past the piston as the same descends.

The body 10 of the device is provided immediately above the cylinder 11 with an enlarged chamber 24, which provides a reservoir for the fluid used in the device. A number of baffle plates 25 are preferably carried by the piston rod 14, and act to prevent an excessive amount of fluid from being thrown up into the housing.

The body is provided with a chamber 26 arranged adjacent the guide cylinder 12, and mounted within it is an inner operating arm 27. An opening 28 is provided in the housing through which the arm 28 may be passed when assembling the device. A cover 29 serves to close the opening 28. 30 is an outer operating arm, which is pivotally carried by the body 10, and has a portion 31, preferably square in cross-section, for engagement with the outer end of the inner operating arm 27, whereby the inner and outer arms will be moved in unison, and easy assembling of the parts insured.

The piston rod head 15 is provided with a lateral recess 35 with which the inner end 36 of the inner operating arm 27 is engageable. This end of the arm is cylindrical in cross-section, whereby it has ample bearing contact with the lower face of the recess 35, thus insuring against excessive wear. In order to keep the end 36 of the inner operating arm 27 in positive contact with the lower surface of the recess 35 a plunger 37 is provided. This plunger is slidably held in the upper end of the piston rod head 15, and projects downwardly into the recess 35. It is provided at its lower end with a flange 38, and a helical spring 39 is arranged about it for pressing it downwardly against the inner operating arm 27. The spring pressed plunger 37, aside from keeping the inner operating arm in contact with the piston rod head, also compensates for wear, thereby keeping the joints between these parts of the shock absorber always tight and free from rattling.

The upper end of the guide cylinder 12 is closed preferably by means of a plate 40, held in place preferably by means of annular springs 41, fitted into annular grooves provided on the interior of the guide cylinder. A cylindrical plug 42 is provided in the body 10 of the device, whereby an opening is provided, which extends preferably into the chamber 24.

Figure 4:
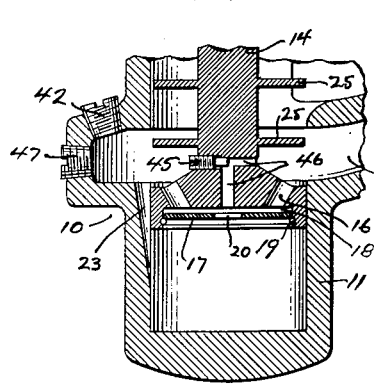
Fig. 4 is a fragmentary, sectional elevation of a modified form of device.

In the modified form shown in Fig. 4, all the parts are substantially identical, to those shown in Figs. 1 to 3, except for the provision of a regulating screw 45, which controls the by-pass through the piston, which is formed by the right angle passageway 46. The body 10 is provided with an opening into the chamber 24, through which the regulating screw 45 may be adjusted when the piston is moved so that the screw will be in registering position with the opening. A plug 47 serves to close the opening.

Figure 5:
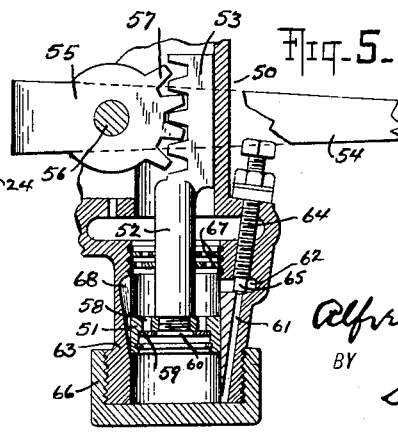
Fig. 5 is a similar view of another modification.

Referring to Fig. 5, 50 represents the housing of the modified form. In this form, the piston 51 is carried by a piston rod 52, having a gear rack 53, formed on its upper end. The operating arm 54 has a return bend portion 55, which is pivoted at 56 in the body. The end of this return bend portion 55 is provided with gear teeth 57 which mesh with teeth of the rack 53 and cause the reciprocation of the rack when the arm is operated. The piston in this form is provided with passageways 58 through its head, and with a valve disc 59 for controlling the passageways 58. The disc is provided with a central aperture 60, and is held so as to permit restricted movement as in the other forms of the invention. In this form, the by-pass 61 extends from the lower end of the cylinder and terminates in a port 62 near the upper end of the cylinder 63. A regulating screw 64 passes through the body and controls the effective size of the by-pass by the relative position of its lower tapered end 65. In this form of the invention, the lower end of the cylinder is preferably closed by means of a cap 66, which is screw-threaded to it. Baffle plates 67 are provided in the upper end of the cylinder for preventing the fluid from splashing up into the upper part of the body. An auxiliary V-shaped by-pass 68 is also provided in this form of the invention.

From the foregoing, it will be obvious that in the form of invention shown in Figs. 1 to 3, the fluid in the cylinder 16, when the end 36 of the inner operating arm 27 is pressed downwardly, will be forced through the by-pass formed by the ports 21 and 22, and also the auxiliary by-pass 23. When the piston is at the upper end of the cylinder, its lower surface will be near the upper end of the V-shaped auxiliary by-pass 23 or at a point where the flow of the fluid through it will be the greatest. This is the point at which the device starts to absorb the shock to the vehicle to which it is attached. As the piston moves downwardly, it will be seen that the effective area of the auxiliary by-pass 23 will become less, whereby the resistance against the downward descent of the piston will be increased. It will thus be seen that through the provision of this auxiliary by-pass of tapered formation, the sudden application of the resistance produced by the device when absorbing shocks or the rebound of the automobile springs, is prevented, and a smooth and gradual application of the device is assured.

The operation of the other forms of the device is identical with the form just above described, but when it is desired to increase or decrease the shock absorbing qualities of the device, this may be done by the regulation of the screws controlling the size of the by-pass in either of the other forms.

Having thus described my invention, what I claim is:

1. A shock absorber characterized by having a cylinder, a ported piston slidably disposed within the cylinder, means for actuating the piston, the piston being so formed as to provide a by-pass of fixed size, and an auxiliary by-pass, which is gradually shut off by the descent of the piston.

2. A shock absorber characterized by having a cylinder, a ported piston slidably disposed within the cylinder, means for actuating the piston, the piston being so formed as to provide a by-pass of fixed size, and an auxiliary by-pass which is gradually shut off by the descent of the piston, and means for regulating the size of the fixed by-pass.

3. A shock absorber characterized by having a cylinder, a ported piston slidably disposed within the cylinder and provided with a recessed head, an inner operating arm having its free end engageable with the recess of the piston head, and an outer operating arm, the cylinder being so formed as to provide an auxiliary by-pass which is gradually shut off by the descent of the piston.

4. A shock absorber characterized by having a cylinder, a ported piston slidably disposed within the cylinder and provided with a recessed head, an inner operating arm having its free end projecting into the recess of the piston head, a spring-pressed plunger bearing against the free end of the inner arm, and an outer operating arm, the cylinder being so formed as to provide an auxiliary by-pass which is gradually shut off by the descent of the piston.

5. A shock absorber characterized by having a cylinder a ported piston slidably disposed within the cylinder and provided with a recessed head, an inner operating arm having its free end provided with a piston rod having a plurality of baffle discs, and means for actuating the piston, the cylinder being so formed as to provide an auxiliary by-pass which is gradually shut off by the descent of the piston.

In witness whereof, I have hereunto signed my name.

ALFRED J. PERKINS.